United States Patent [19]
Patzelt et al.

[11] Patent Number: 5,114,591
[45] Date of Patent: May 19, 1992

[54] ORGANIC CONTAMINANT REMOVAL FROM PAINT SPRAY BOOTH WATER

[75] Inventors: R. R. Patzelt, Bloomfield Hills, Mich.; M. A. Romba, Orland Park, Ill.

[73] Assignee: Nalco Chemical Company, Naperville, Ill.

[21] Appl. No.: 772,766

[22] Filed: Oct. 7, 1991

[51] Int. Cl.$^5$ .............................................. B01D 15/04
[52] U.S. Cl. ..................................... 210/663; 210/692
[58] Field of Search ............... 210/660, 661, 663, 681, 210/679, 683, 690, 691, 692; 55/85

[56] References Cited

U.S. PATENT DOCUMENTS 4,699,730 10/1987 Miles et al. ............................. 55/85

*Primary Examiner*—Frank Sever
*Attorney, Agent, or Firm*—Joan I. Norek; Robert A. Miller; Joseph B. Barrett

[57] ABSTRACT

The organic material content of acid break water from the HEC process, or similar waste water, is reduced by adsorption onto macroreticular resin.

18 Claims, No Drawings

ORGANIC CONTAMINANT REMOVAL FROM PAINT SPRAY BOOTH WATER

TECHNICAL FIELD OF THE INVENTION

The present invention is in the technical field of removal of contaminants from water, and more particularly the technical field of low energy separation of soluble organics from waste water applied to the break water from the HEC process and other paint spray booth waste waters.

BACKGROUND OF THE INVENTION

The HEC process is a waste material management program for industrial paint spray booths, as described in more detail below. Solid wastes from a paint spray booth are collected ultimately as a sludge phase which generally is suitable for transfer, without further treatment, to a waste-derived fuels program. The HEC process also generates an oil phase, which can be recycled, and a water phase. Such water phase routinely has a significant concentration of solutes of both the organic and inorganic type. Reduction of the contaminants in that water phase, particularly the organic contaminants, is highly desirable prior to discharging the water, and is essential if such water phase is to be rendered suitable for recycle to the HEC process.

As in most every decontamination program on an industrial scale, the economics of the method(s) employed is very important. A suitable method must be cost effective, and the cost factors to be considered include the energy demands of the method, the costs of materials used, the depletion of the materials used, the space and/or time requirements of the method, the servicing time required, the equipment required, the effectiveness of the method for the purposes of greatest priority, and the like.

The object of the present invention is to provide a cost effective method for a decontamination program applied to the water phase (break water) derived from the HEC process, and other objects as described below. The object of the present invention is also to provide a cost effective method for such a program applied to paint spray booth waste waters other than from the HEC process.

DISCLOSURE OF THE INVENTION

The present invention provides a method for reducing the organic material content of break water from an HEC process comprising passing such break water through a column containing at least one type of macroreticular resin, whereby a portion of the organic material in such break water is adsorbed by such resin.

The present invention also provides a method for reducing the organic material content of waste water having contaminants of the type and at the concentrations of break water from an HEC process comprising passing such waste water through a column containing at least one type of macroreticular resin, whereby a portion of the organic material in such waste water is adsorbed by such resin.

PREFERRED EMBODIMENTS OF THE INVENTION

The preferred embodiments of the invention include preferred process parameters, including resins employed, and additional process steps both ahead and behind the adsorption step, which may also include a resin regeneration step(s).

The HEC Process

Commercial paint spraying is routinely done in an enclosed area called a paint spray booth. While transfer efficiencies vary from installation to installation, a significant portion of the paint formulation sprayed is not transferred to the article being coated or painted in the paint spray booth. Such overspray is captured by a hydrophilic fluid which is provided in the paint spray booth to prevent the overspray from contacting and adhering to the surfaces of the paint spray booth. In the HEC process, such hydrophilic fluid is an oil-in-water emulsion, and versions thereof are described in U.S. Pat. No. 4,378,235, issued Mar. 29, 1983, inventors Cosper et al., U.S. Pat. No. 4,563,199, issued Jan. 7, 1987, inventors Lindenberger et al., U.S. Pat. No. 4,750,919, issued Jun. 14, 1988, inventors Patzelt et al., and U.S. Pat. No. 4,919,691, issued Apr. 14, 1990, inventors Patzelt et al., the disclosures of all of which are hereby incorporated hereinto by reference. Such oil-in-water emulsions are highly advantageous in their effectiveness in paint detackification and also in absorption of volatile organic carrier ("VOC"). VOC and the other constituents of the paint formulation are received by the emulsions. Such paint formulation constituents include, without limitation, a liquid vehicle or solvent in which other constituents are dispersed and/or dissolved, film-forming materials including preformed high molecular weight polymeric materials and/or precusors to high molecular weight polymers, inorganic and/or organic pigments to provide opacity and/or color, and other additives. The oil-in-water emulsion generally recirculates through a paint spray booth, and is generally collected or removed from a paint spray booth on either a periodic or continuous basis to avoid overloading of this fluid, and hence avoid failure of this fluid to detackify the overspray. After collection of used emulsion, the emulsion is normally broken, whereupon the components of the emulsion separate into phases. Such phases are at least an oil phase and a water phase, and very commonly there will also be a separate sludge phase which contains a high concentration of solids. The sludge phase also generally contains some of the organic liquid of the initial emulsion, some water and some VOC, but its high solids content renders it a waste material. The oil phase of a broken emulsion, however, generally can be recovered and recycled for use in forming fresh emulsion, provided there is a relatively clean break and therefore an oil phase substantially free of waste materials. The water phase of a broken emulsion however is commonly too contaminated for recycling and such contamination may be a severe waste disposal problem. The emulsion breaking is commonly accomplished by pH adjustment downward to a pH value of 6.5 or less, the emulsion being at least in part formed with a surfactant that fails at an acid pH. When such method is used to break the emulsion, the water phase of the broken emulsion is often referred to as the "acid break water". The HEC process may, however, employ emulsions designed for breaking by mechanisms other than a downward adjustment of pH, including emulsion breaking means of the chemical and mechanical type.

Other Waste Waters

Waste water from commercial paint spray booth operations that employ hydrophilic fluids other than the emulsion of the HEC process may also be too contaminated for recycling and present a severe waste disposal problem. Such other hydrophilic fluids include water dosed with clay, metal salt/organic amine mixtures, clay/polymer mixtures, clay/amine mixtures, all-organic agents and at times for easier to treat paint a combination of caustic and sodium silicate. As with the HEC process, such hydrophilic fluids capture the overspray and detackify the material therein, producing various types of sludges. Such sludges are then removed by such systems as gravity filtration, vacuum assisted filtration, air flotation, air assist flotation with skimmer, natural flotation skimmer, manual shovel method, and bottom removal of sinking sludge. The spent hydrophilic fluids, after sludge removal, generally contain high levels of water soluble or colloidal organic material.

The Macroreticular Resin

A macroreticular resin, also known in the art as a macroporous resin and at times macroporous ion exchange resin, has pores of a considerably larger size than a conventional gel type resin. Synthetic organic resins generally are cross-linked polymers. The porosity and particle size of such resins are controlled by the conditions of their polymerization. The cross-linking of such polymers is generally provided by the inclusion of a difunctional monomer, for instance divinyl benzene ("DVB"). Such polymers are commonly prepared in mass polymerization (by suspension) wherein the backbone polymer is prepared from a combination of monofunctional and difunctional monomers. For example, a conventional gel-type styrene-based, resin may be prepared by copolymerizing styrene and commercial DVB at various ratios, and for such a polymer matrix the porosity is inversely related to the DVB cross-linking and the matrix has no appreciable porosity until it is swollen in a suitable solvating medium. A macroporous or macroreticular resin in contrast does have a structure with true porosity and a high surface area. A macroreticular resin is prepared by a mass polymerization in the presence of large amounts of nonpolymerizable diluents, and it is the presence of such diluents that provides the true porosity and larger size pore characteristics. Pore diameters of macroreticular resins may be up to several thousand Angstrom units. The surface areas of macroreticular resins may reach 500 m$^2$/g or higher. If prepared with a sufficient degree of cross-linkage, the macroporous polymers exhibit little volume change in solvent, even on transfer from a highly polar to an essentially nonpolar solvent.

Macroreticular resins, like gel-type ion exchange resins, have no appreciable solubility in most common solvents. Strong oxidizing agents, such as boiling nitric acid or chromic acid/nitric acid mixtures, generally degrade the polymer matrix of both types of resins, and the greater porosity and surface area of macroreticular resins create a greater exposure to potential oxidants than gel-type resins, at similar degrees of cross-linking. The high degree of cross-linking commonly present macroreticular resins does improve apparent oxidation stability. Macroreticular resins also have reasonable thermal stabilities.

The polymer matrixes of these resins can be phenolic resins (phenolic condensation products), addition polymerizations products such as styrene-DVB copolymers and copolymers of the acrylate type (esters of acrylic and/or methacrylic acid), epichlorohydrin-amine condensates and the like. Ion exchange resins, including macroreticular ion exchange resins, must have functional groups that provide the ion exchange activity (ion-active sites), such as sulfonic or amine groups. Such ion exchange resins do sorb neutral molecules to varying degrees. The macroreticular resins used in the present invention, in contrast, are employed primarily for adsorption purposes, and thus while they may also have ion-active sites, such ion-active sites are not essential, and when present are preferably of the weak ion exchange type. For instance, for an acrylate type polymer resin, for adsorption it is desirable to retain a high degree of ester functionality, while for ion exchange purposes a significant portion of the ester functionality would be hydrolyzed to release the ion-active carboxylic acid functionality.

Macroreticular resins suitable for use in the process of the present invention are commercially available, for instance the resins available under the Amberlite trademark (XAD series) from Rohm and Haas Company, and Duolite trademark from Diamond Shamrock Company.

Other information concerning macroreticular resins is available from current literature and references, for instance U.S. Pat. No. 3,549,562 (1970, Mindick et al.) and articles such as that by J.R.Millar, D.G.Smith, W.E.Mar, and T.R.E.Kressman, Journal of Chem. Soc., 183 (1963) and W.G.Lloyd and T.Alfrey, Jr., Journal of Polymer Science, Vol. 62, 301 (1962), the disclosures of each of which are hereby incorporated hereinto by reference.

The physical properties of some of the macroreticular resins which are commercially available are set forth below in Table 1.

TABLE 1

| Resin[1] | Porosity Volume % | Surface Area (m$^2$/g) | Average Pore Dia. (A) | Bulk Density (g/cc) | Surface Groups | Nominal Mesh Sizes |
|---|---|---|---|---|---|---|
| XAD-340 | 34 | 400 | 150 | 0.60 | Nonpolar | 20–50 |
| XAD-2 | 42 | 330 | 90 | 0.67 | Nonpolar | 20–50 |
| XAD-4 | 51 | 750 | 50 | 0.62 | Nonpolar | 20–50 |
| XAD-7 | 55 | 450 | 80 | 0.62 | Polar | 20–50 |
| XAD-8 | 52 | 140 | 250 | 0.62 | Polar | 25–50 |
| S-37 | 35 | | | 0.34 | Polar | 16–50 |
| S-761 | 35 | | | 0.34 | Polar | 16–50 |
| L-863 | | | | 0.60 | Nonpolar | 20–50 |

[1]XAD resins are in the Amberlite series of Rohm and Haas Company and the S and L resins are in the Duolite series of Diamond Shamrock Company.

Further concerning the above-noted resins, the Amberlite XAD-2 and XAD-4 resins and the Duolite L-863 resin are nonionic styrene-DVB polymers. Amberlite XAD-7 and XAD-8 resins are copolymers having an aliphatic matrix and a polar surface, basically polymethacrylates. The Duolite S-37 and S-761 resins are weak-base phenolformaldehyde-amine resins. The Amberlite XAD-340 resin is produced by the partial pyrolysis of beads of macroreticular synthetic polymer, which pyrolysis produces a surface that is believed to be more nonpolar than the other macroreticular resins and even more nonpolar than activated carbons.

In preferred embodiment the macroreticular resin used in the present invention is one having an average pore volume (average porosity percent) of from about 25 to about 65 percent.

For a given pore volume percentage there is an inverse relationship between the average pore diameter and the surface area per unit weight. Resins with a smaller pore diameter, at a given pore volume, will provide more surface area than one with a larger pore diameter. It is desirable thus to select a resin with a small pore diameter so that there is a large surface area available for adsorption. The pore diameter must not, however, be so small that the resin's surface area provided by such pores are not available to the larger-sized solutes to be adsorbed in the present process. Hence while the most critical parameter concerning the resin's pore size is a minimum pore size, the preferred pore sizes are at or close to such minimum. It is believed generally that a minimum pore size, as an average, of about 25 Angstrom units is required for the present process. A practical maximum average pore size is about 1,000 Angstrom units, given the size of the resin particles and the decreasing surface area as the pore diameters increase. In preferred embodiment, the macrorecticular resin is one having an average pore diameter of from about 25 to about 500, or 600, Angstrom units.

In preferred embodiment, the macrorecticular resin employed in the present invention has a minimum surface area of 50 $m^2$/gram, and in more preferred embodiment the surface area of the macrorecticular resin is at least 100 $m^2$/gram. Macrorecticular resins having surface areas in excess of 300, or 500, $m^2$/g are even more preferred, provided however that the average pore diameter of such resins does not fall below about 25 Angstrom units.

The bulk densities of the above described macroreticular resins will generally be within the range of from about 0.5 to about 0.75 g/cc, the bulk densities being dependent in significant part on the porosity volume percentages of the resins.

The average particle size of macroreticular resins employed in the present process preferably are within the range of from about 0.1 to about 5 mm for fixed bed units.

Column, Depth to Diameter Ratio

In preferred embodiment, the ratio of the column depth to diameter is from about 2:1 to about 20:1 and in more preferred embodiment such ratio is from about 10:1 to about 14:1.

Retention Time

The retention time for the waste water in the column, or in other words the contact time between the adsorbent and the adsorbate, in preferred embodiment is from about 0.5 to about 20 gallons waste water per minute per cubic foot of resin, and in more preferred embodiment is from about 3 to about 4 gallons per minute per cubic foot of resin.

Wastewater pH

In preferred embodiment, the pH of the wastewater influent is from about 2 to about 8, and in more preferred embodiment is from about 7 to about 8.

Temperature

The adsorption on macroreticular resin in preferred embodiment should be conducted within a temperature range of from about 1.0° C. to about 180° C., and in more preferred embodiment from about 15° C. to about 40° C.

Soluble Organics

The terminology of "soluble organics" or like terminology includes organic material that is present in the water as single molecule species, and also as polymer and aggregates or colloids thereof, provided that such polymers, aggregates and/or colloids are soluble in the water in the sense of having a setting time, 1 m fall, in excess of six months, or are soluble in the water in the sense of having a diameter of no more than 1,000 Angstrom units. The presence of soluble organics having particle sizes in excess of the resin pore diameters is not inconsistent with the purposes of the present invention, provided that not all of the soluble organic material in the water that is being decontaminated has so large of particle size that none penetrates the pores of the resin.

The Acid Break Water

The acid break water, or break water, typically has the characteristics set forth in Table 2 below.

TABLE 2

| Characteristic | Value or Identity |
| --- | --- |
| pH | Below 6.5, and commonly from about 2 to about 3 |
| BOD | From about 20,000 to about 80,000 ppm |
| COD | From about 20,000 to about 80,000 ppm |
| SS | Less than 0.5 percent at pH of about 3 and from about 0.5 to about 1.5 percent at pH of about 7 |
| TDS | From about 5,000 to about 10,000 ppm |
| Organics | Mainly carboxylic acids and salts thereof |

The above identification of the organics as mainly carboxylic acids and salts thereof does not mean that other types of organics, particularly highly objectionable or difficult to remove organics, such as phenols, are absent. As shown in Example 1 below, organics such as phenols are present in small, but undesirable, amounts. The carboxylic acids/salts generally comprise at least about 50 wt. percent of the organics. The potential for recycling acid break waters having the characteristics indicated in Table 2 above may be an unrealistic goal because recycling requires the removal of both organic and inorganic contaminants in a cost effective manner. The present invention may be more aptly employed to reduce the waste disposal problems posed by such break waters. In particular, the present invention may be more aptly employed to reduce the organic contaminants of the break water, particularly the soluble organic contaminants.

Paint spray booth waste waters other than that from the HEC process may well be comparable to the HEC breakwater as to the need to reduce the organic contaminants therein, although such waste waters routinely would not contain as high of a carboxylic acids/salts level as is typically found in the HEC breakwater.

Water Contamination Tests

The contaminants in water include anything in the water that is not $H_2O$, and hence include organic and inorganic material. The water analysis tests used to describe such contaminants, or a portion of such contaminants, are mainly nonspecific tests of the type routinely relied upon in the art. The test employed to measure the change in the organic content of the acid break water before and after treatment is the COD concentration test. COD stands for "chemical oxygen demand" and the test is a measure of organic matter and other reducing substances. The COD test measures the ability of hot chromic acid solution to oxidize organic matter, and thus is a measure of both biodegradable and nonbiodegradable (refractory) organic matter present in the water. Another test mentioned herein is the BOD test (biochemical oxygen demand test), which measures the ability of common bacteria to digest organic matter, and thus is a measure of the biodegradable organic matter present in water, expressed as $O_2$. The TDS test is a measure of total dissolved solids in the water. The SS test is a measure of the solid material that is removed by filtration through a 0.45 micron millipore filter.

BOD Removal

It is believed that at least some break waters contain some amount of organic material that is not adsorbed onto the macroreticular resins. In the tests described in Examples 1 to 6, an effluent BOD of 10,574 ppm was the lowest obtained even though the influent COD ranges from 26,689 to 64,000 ppm.

The TDS

The TDS (total dissolved solids) may affect the adsorption of a particular organic compound, and generally the presence of a high TDS, for instance a TDS of 5,000 ppm or higher, will decrease the loading capacity of the macroreticular resin for one or more of the organic compounds in the break water.

EXAMPLE 1

A 5 gallon sample of acid break water collected from a commercial HEC process was first neutralized to a pH of about 7 at room temperature and filtered. From this sample a 9 liter aliquot was run through a column of macroreticular resin. The column diameter was 3 inches and the column height was 12 inches. The macroreticular resin used in the column was Amberlite XAD-16 (Amberlite is a trademark of the Rohm & Haas Col, of Philadelphia, Pennsylvania, from which such resin is commercially available). The column held approximately 0.05 cubic feet of this resin. The aliquot was passed through this column at a flow rate of 500 ml. per minute. Of the 9 liters run through the column, the first, third, fifth, seventh and ninth were collected as effluents for determination of the concentration of COD, phenols and inorganic compounds. The same analyses were also conducted on the acid break water influent (untreated). The results of such analyses are set forth below in Table 3.

TABLE 3

| | Contaminant Concentrations in ppm | | | | | |
|---|---|---|---|---|---|---|
| | Influent | 1st Liter | 3rd Liter | 5th Liter | 7th Liter | 9th Liter |
| COD | 64,000 | 19,000 | 36,000 | 45,000 | 54,000 | 54,000 |
| Phenols | 11.7 | 5.8 | 1.9 | 0.8 | 1.3 | 1.7 |
| Sodium | 9,400 | 5,300 | 9,000 | 9,600 | 9,000 | 7,900 |
| Potassium | 710 | 360 | 670 | 710 | 680 | 600 |
| Calcium | 300 | 210 | 280 | 300 | 290 | 250 |
| Magnesium | 100 | 75 | 94 | 100 | 98 | 87 |
| Copper | 0.6 | 0.6 | 0.5 | 0.6 | 0.6 | 0.5 |
| Manganese | 1.3 | 0.6 | 1.1 | 1.3 | 1.2 | 1.1 |
| Zinc | 2.3 | 3.8 | 3.2 | 3.4 | 3.2 | 2.6 |
| Chromium | 1.2 | 0.0 | 0.0 | 0.0 | 0.0 | 0.0 |
| Lead | 2.2 | 2.0 | 1.1 | 1.8 | 1.1 | 1.1 |
| Tin | 8.6 | 1.8 | 2.3 | 2.9 | 2.4 | 1.8 |
| Antimony | 3.9 | 0.0 | 0.0 | 0.0 | 0.0 | 0.0 |

Since a bed volume of 0.05 cubic feet is equivalent to about 1.4 liters, the first, third and fifth liter effluents represent respectively 0.7, 2.1 and 3.6 bed volumes. The average COD concentration of these effluents is 33,000 ppm, which represents, as an average, about a 48 percent removal of COD. The average removal of phenols based on these effluents was about 76 percent.

EXAMPLE 2

A test similar to the one described in Example 1 above was conducted wherein the acid break water was treated at a pH of 3.0, instead of neutralizing the sample before treatment. The column size was reduced to a bed volume of about 0.8 liters (a column diameter and height of respectively 2.5 and 10.0 inches) and the flow rate was reduced to about 80 ml./minute. The influent COD concentration was 26,689 ppm. The effluent COD concentration after four bed volumes was 23,311 ppm. The average COD removal over four bed volumes was 19 percent.

EXAMPLES 3 to 6

Four tests similar to the one described in Example 1 above were conducted wherein the acid break water's pH was raised to 8.0. Different macroreticular resins were used in each test, while the other test parameters were the same for each of Examples 3 to 6. As to these other parameters, the column diameter was 2.5 cm, the column height was 4.0 cm, and the flow rate was 5 ml per minute. The acid break water treated in each test was taken from the same sample. The influent COD for each test was 37,160 ppm. The identities of the macroreticular resins used, the effluent COD concentrations after four bed volumes and the average COD removed by the treatments over four bed volumes are set forth in Table 4 below.

TABLE 4

| Example No. | 3 | 4 | 5 | 6 |
|---|---|---|---|---|
| Resin Type (Amberlite) | XAD-2 | XAD-4 | XAD-8 | XAD-16 |
| Effluent COD (ppm) | 22,054 | 19,033 | 24,340 | 21,341 |
| Average % COD Removed | 52.0% | 56.9% | 45.0% | 52.4% |

Regeneration of Resin

In preferred embodiment the process of the present invention includes the step of macroreticular resin regeneration, and such regeneration is preferably done by elution of the organic materials from the resin with methanol. The waste methanol/organic stream resultant from such elution preferably would be sent to a waste-derived fuels program without any further treatment. Such preferred embodiments do not, however, exclude the use of other regeneration methods, such as using steam, acids, bases, or water-miscible organic solvents other than methanol.

Bulk Decontamination

The adsorption process of the present invention does not exclude the use of bulk decontamination, or clarification, steps ahead of the adsorption step. Moreover, when the break water contains precipitates or visible suspended solids, bulk decontamination steps ahead of the adsorption process are generally required so as to avoid fouling the adsorption column. Such bulk decontamination step(s) may be one or a combination of methods well known to those of ordinary skill in the art of water clarification, and include mechanical methods such as filtration and chemical methods such as coagulation and flocculation, and the like.

Polishing Steps

The adsorption process of the present invention does not exclude the subsequent use of one or more polishing steps as post treatments. Such post treatments include, without limitation, the removal of soluble or colloidal organic material by absorption on activated carbon and water conditioning using oxidizing agents such as hydrogen peroxide (acid), ozone, permanganate, chlorine dioxide, bromine and the like.

The present invention is a method for reducing the organic content of waste water from a paint spray booth, particularly the break water from an HEC process, comprising passing such water through a column containing at least one type of macroreticular resin, whereby a portion of the organic material is adsorbed by such macroreticular resin. The present invention is believed very useful when the waste water, as an influent into such column, has an organic material content of at least about 5,000 ppm as COD, and even more useful when the waste water, as an influent into such column, has an organic material content of at least about 20,000 ppm as COD. The present invention is also such a method wherein the influent is waste water having a contaminant content similar to that of paint spray booth waste water, particularly when such waste water, as the influent introduced to the column, has an organic material content of at least about 5,000 ppm as COD, and preferably no higher than about 80,000 ppm as COD.

The present invention is also a process for removing contaminants from the break water of an HEC process, which process can also be applied to waste waters having similar contaminants, as noted in more detail above, wherein such break water is passed as an influent through a fixed bed of macroreticular resin, and wherein the break water contains soluble organic material, which organic material content is reduced by at least 15 weight percent by the process, and preferably at least 40 weight percent.

The method and process of the present invention can include further steps, as noted above, including the regeneration of the macroreticular resin by eluting at least a portion of the organic material therefrom with methanol. Such additional steps also include bulk method clarification before the break water or waste water is contacted with the macroreticular resin and effluent polishing steps, such as adding to the effluent a sufficient amount of oxidizing agent to oxidize at least a portion of any organic material remaining in such effluent, particularly when the oxidizing agent is hydrogen peroxide.

The the present invention may be used to decontaminate waste waters generally which have contaminants similar to the break water of the HEC process, the preferred application of the present invention nonetheless is its application to the HEC process break water. It is believed that other waste waters, even though similar, would not wholly present the decontamination problems that are presented by such break water.

Industrial Applicability of the Invention

The present invention is applicable to the waste water treatment and paint spray industries, and other industries serviced thereby, such as the automotive industry which relies on paint spray booth installations for the coating of vehicles.

We claim:

1. A method for reducing the organic material content of waste water from a paint spray comprising passing said waste water through a column containing at least one type of macroreticular resin, whereby a portion of said organic material is adsorbed by said macroreticular resin.

2. The method of claim 1 wherein said waste water as the influent has an organic material content of at least 5,000 ppm as COD.

3. The method of claim 2 wherein said waste water as the influent has an organic material content of at least 20,000 ppm as COD.

4. The method of claim 1 wherein said waste water is break water from an HEC process.

5. The method of claim 1 wherein said macroreticular resin has an average pore volume percentage of from about 25 to about 65 percent.

6. The method of claim 1 wherein said macroreticular resin has an average pore diameter of about 25 Angstrom units or larger.

7. The method of claim 1 wherein said macroreticular resin has a minimum surface area of about 50 $m^2/g$.

8. The method of claim 1 wherein said macroreticular resin has a surface area of at least about 100 $m^2/g$.

9. A method for reducing the organic material content of paint spray booth waste water by introducing said waste water as an influent into a column, wherein said waste water as said influent has an organic material content of at least about 5,000 ppm as COD, comprising:

allowing said influent to pass through said column, wherein said column contains at least one type of macroreticular resin, whereby a portion of said organic material is adsorbed by said macroreticular resin.

10. The method of claim 9 wherein said waste water is break water from an HEC process.

11. The method of claim 9 wherein said macroreticular resin has an average pore volume percentage of from about 25 to about 65 percent and an average pore diameter of from about 25 Angstrom units to about 1,000 Angstrom units.

12. A process for removing contaminants from the break water of an HEC process comprising:

passing said break water as an influent through a fixed bed of macroreticular resin,
wherein said break water as an influent contains soluble organic material, and wherein said break water as the effluent from said fixed bed contains at least about 15 weight percent less organic material than said break water as said influent.

13. The process of claim 12 wherein said break water as the effluent from said fixed bed contains at least 40 weight percent less organic material than said break water as said influent.

14. The process of claim 12 further including the step of eluting at least a portion of organic material adsorbed by said macroreticular resin with methanol.

15. The process of claim 12 further including the step of bulk method clarification of said break water prior to passing said break water through said fixed bed.

16. The process of claim 12 further including the step of removing contaminants from said break water as said effluent by contacting said effluent with activated carbon and then separating said effluent from said activated carbon.

17. The process of claim 12 further including the step of removing contaminants from said break water as said effluent by adding to said break water as said effluent an amount of oxidizing agent sufficient to oxidize at least a portion of any organic material in said break water as said effluent.

18. The process of claim 17 wherein said oxidizing agent is hydrogen peroxide.

* * * * *

UNITED STATES PATENT AND TRADEMARK OFFICE
CERTIFICATE OF CORRECTION

PATENT NO. : 5,114,591
DATED : May 19, 1992
INVENTOR(S) : R. R. Patzelt and M. A. Romba It is certified that error appears in the above-identified patent and that said Letters Patent is hereby corrected as shown below:

In column 6, line 25, delete "setting" and substitute therefor -- settling --.

In line 2 of Claim 1, column 10, line 22, after "paint spray" insert -- booth --.

Signed and Sealed this

Sixth Day of July, 1993

*Attest:*

MICHAEL K. KIRK

*Attesting Officer*     *Acting Commissioner of Patents and Trademarks*